United States Patent [19]

Koue

[11] Patent Number: 5,101,428
[45] Date of Patent: Mar. 31, 1992

[54] LINE CONTROL SYSTEM ADAPTED FOR A FACSIMILE MACHINE FOR DETECTING A BUSY TELEPHONE SIGNAL

[75] Inventor: Toshiaki Koue, Saitama, Japan

[73] Assignee: Fuji Xerox Co. Ltd., Tokyo, Japan

[21] Appl. No.: 583,564

[22] Filed: Sep. 17, 1990

[30] Foreign Application Priority Data

Mar. 14, 1990 [JP] Japan .......................... 2-63854

[51] Int. Cl.⁵ ...................... H04M 11/00; H04M 1/00
[52] U.S. Cl. .................................... 379/100; 379/355
[58] Field of Search ............... 379/100, 216, 354, 355, 379/381, 382, 386, 377

[56] References Cited

U.S. PATENT DOCUMENTS

| 4,473,720 | 9/1984 | Hegi ............................. 379/355 |
| 4,741,021 | 4/1988 | Kotani et al. ................. 379/100 |
| 4,741,029 | 4/1988 | Hase et al. ..................... 379/355 |
| 4,995,076 | 2/1991 | Joffe et al. ..................... 379/386 |

FOREIGN PATENT DOCUMENTS

| 62-265860 | 11/1987 | Japan ........................... 379/100 |
| 63-88965 | 4/1988 | Japan ........................... 379/100 |
| 1-231561 | 9/1989 | Japan ........................... 379/381 |

Primary Examiner—James L. Dwyer
Assistant Examiner—Wing F. Chan
Attorney, Agent, or Firm—Finnegan, Henderson, Farabow, Garrett, and Dunner

[57] ABSTRACT

A line control system adaptable to a facsimile machine having access to a plurality of foreign telephone exchanges with different busy tone specifications for detecting a busy telephone signal in which a busy tone specification corresponding to each of the plurality of telephone exchanges is stored in a memory whether a dialed telephone number is associated with a respective one of the foreign telephone exchange is determined. The busy tone specification corresponding to the respective foreign telephone exchange is accessed from the memory based on the determination; and a busy signal received from the respective foreign telephone exchange when the dialed telephone number is busy is compared with the accessed busy tone specification to determine whether the busy signal is a valid busy signal.

5 Claims, 2 Drawing Sheets

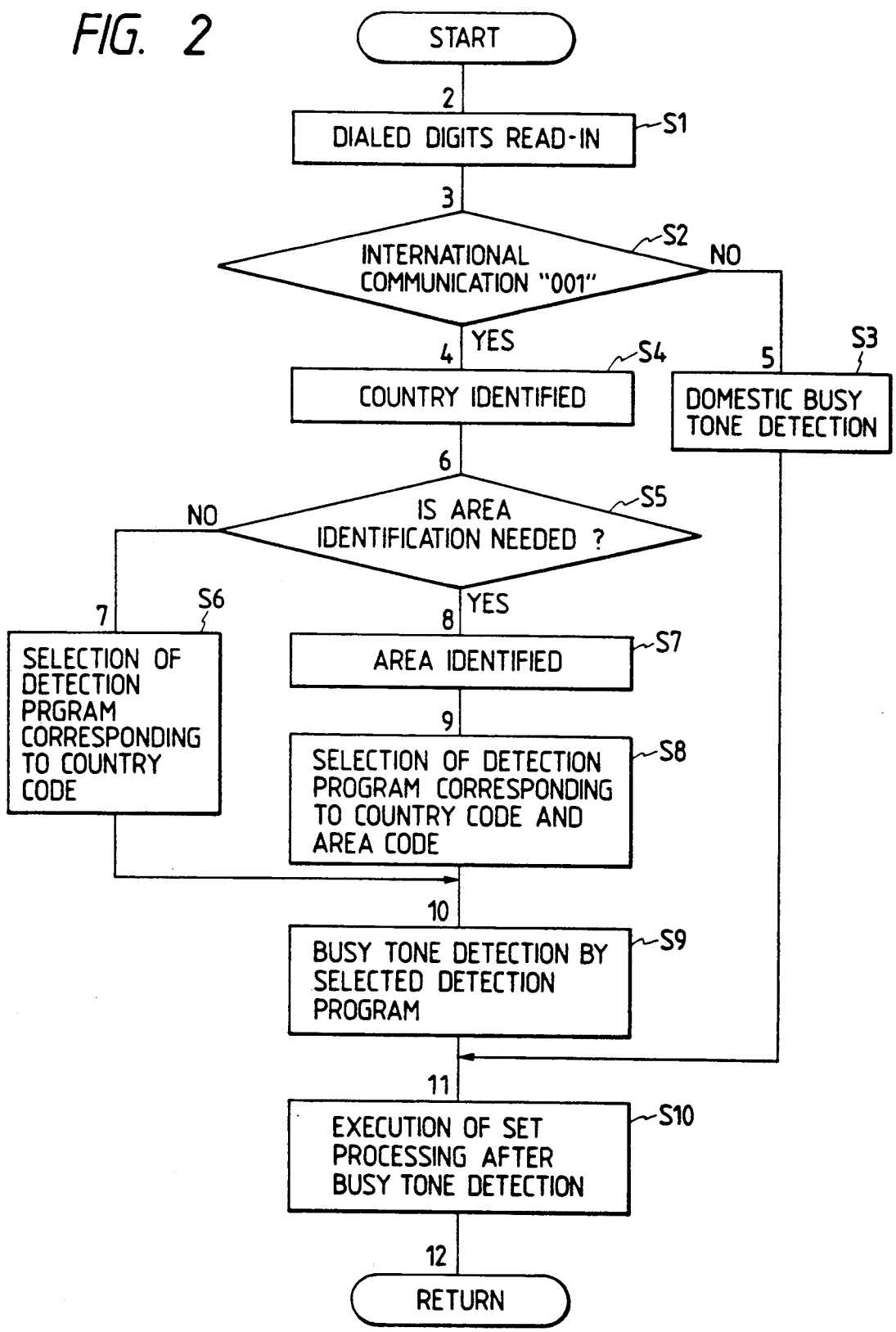

LINE CONTROL SYSTEM ADAPTED FOR A FACSIMILE MACHINE FOR DETECTING A BUSY TELEPHONE SIGNAL

BACKGROUND OF THE INVENTION

1. Field of the Invention

The present invention relates to a facsimile machine line control system. More particularly, the invention relates to a facsimile machine line control system that is suitable for overseas communications.

2. Description of the Related Art

Three types of network control unit (NCU) used for facsimile machines are: manual transmission—manual reception (MM) type; manual transmission—automatic reception (MA) type; and automatic transmission—automatic reception (AA) type. Within these types, the AA type, i.e., facsimile equipment with an automatic transmission function, has recently come to be the most common.

A facsimile machine with an automatic transmission function is one that can automatically call prespecified destinations and transmit image information at preset times. Generally, such a facsimile machine has an automatic redialing function to disconnect and call a station again after a preset delay if the facsimile machine receives a busy tone from the called station.

Busy tones are emitted by exchanges. An exchange detects a request from a calling station for connection to a called station, but if the called station is connected to another station at the time the exchange emits an audible signal, i.e., a busy tone. In the case of the Nippon Telegraph & Telephone Company (NTT), for example, 400 Hz signals (impulse ratio 60 IPM ±20%, make ratio 50±10%) are transmitted as busy tones.

A facsimile machine or similar terminal device can detect such busy tones, cut the line, and then perform various types of processing such as redialing or, during sequential transfer or trunk broadcasts, etc., calling of subsequent stations and polling.

The following problem exists with line control systems which effect detection of busy tone and subsequent processing in this manner. Within Japan, for example, it is satisfactory if busy tones are detected and subsequent processing is performed by a facsimile machine line control system that has been designed for detection of busy tones in accordance with the above-noted NTT specification. However, in recent years direct connection with international circuits has become common, which means that there is an increasing need for detection of busy tones based on the exchange specifications of various overseas countries. However, conventional facsimile machine line control systems effect control based on domestic Japanese specifications, despite the fact that the busy tone specifications vary considerably in different countries.

There has been the problem that when such line control systems, which effect control based on domestic Japanese specifications, are used to conduct international communications, either they are incapable of detecting busy tones that are based on the independent specifications of individual countries or they are responsible for detection errors.

If a busy tone cannot be detected, it is necessary to wait for a set time for a reply before it is possible to come to the conclusion that a response from the called station is unobtainable. This means that until this conclusion is reached, wasted actions are performed because of the wait for a response and there is a delay in the starting of various forms of processing that are scheduled for execution after detection of a busy tone.

SUMMARY OF THE INVENTION

An object of the present invention is a facsimile machine line control system that detects busy tones even when directly connected to overseas parties.

Another object of the present invention is to improve the reliability of a facsimile machine line control system for detecting busy tones of telephones connected to foreign exchanges.

A further object of the present invention is to improve the efficiency of processing of facsimile machines by the more accurate detection of busy tones.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims To achieve the objects and in accordance with the purpose of the invention, as embodied and broadly described herein, the present invention comprises a line control system for use in a facsimile machine that communicates with various foreign telephone exchanges that emit busy signals with different specifications when the telephone line of a party called by the facsimile machine is busy, comprising busy tone specification storing means for storing specifications identifying the various busy signals emitted by the foreign exchanges when a called telephone is in use, dialed digits identification means for identifying that a number called by the facsimile machine is in a foreign country, means for accessing from the storing means the specifications of the busy signal for the country of the called number, and busy tone detection means for comparing a return signal received by the facsimile machine in response to the calling of the called number to the accessed specifications to determine if the return signal corresponds to a busy signal.

BRIEF DESCRIPTION OF THE DRAWINGS

The accompanying drawings, which are incorporated in and constitute a part of this specification illustrate embodiment(s) of the invention and, together with the description, serve to explain the objects, advantages and principles of the invention. In the drawings.

FIG. 2 is a flowchart of the operation of the facsimile machine line; control system of FIG. 1.

DETAILED DESCRIPTION OF THE PREFERRED EMBODIMENT

According to the present invention, in order to detect busy tones that are emitted by various overseas exchanges, detection programs corresponding to the various busy tones are stored. The telephone number digits that are dialed are examined in order to identify whether a station that is the destination of a communication is an overseas station. If the station is overseas, the country and area in which it is located are identified, and busy tone detection is effected using a program for detecting the relevant busy tone selected on the basis of the identification.

The facsimile machine line control system of the present invention can detect busy tones that are emitted in accordance with the exchange specifications of different countries and areas through the use of detection programs which respond to the various busy tones. Consequently, even in direct-connection facsimile communications with overseas parties, it is possible to perform various types of processing efficiently after detection of a busy tone in the same way as in domestic communications.

Figure 3:
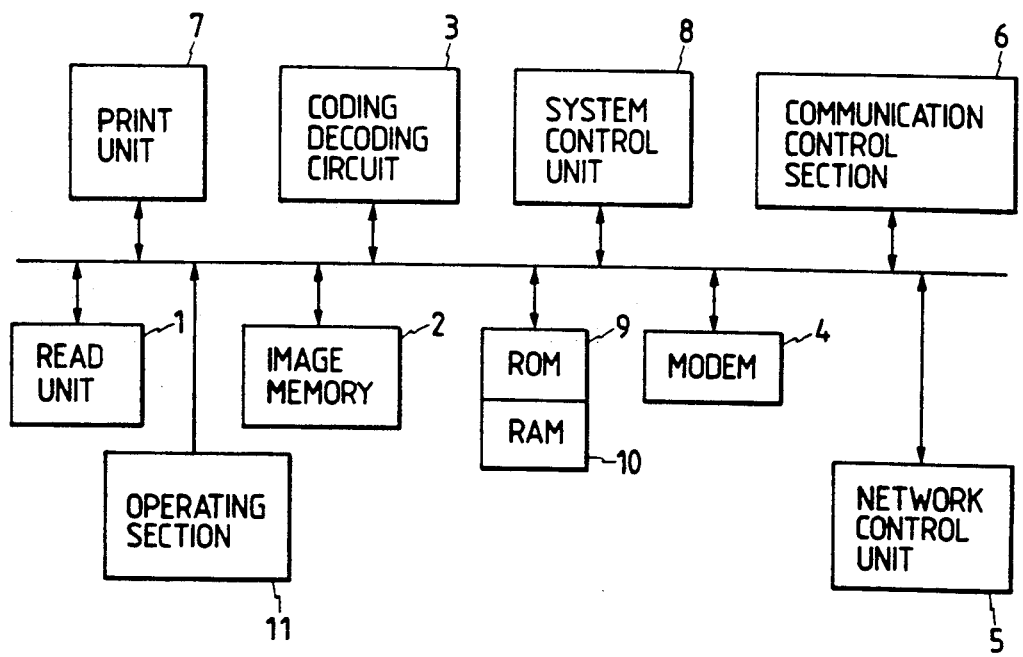
FIG. 3 is a block diagram of hardware for implementing the facsimile machine line control system of the present invention.

A detailed description of the invention will now be given with reference to the drawings. FIG. 3 is a block diagram showing the hardware configuration of a facsimile machine illustrating an embodiment of the present invention. Referring to the drawings, image information read by a reading unit 1 is subjected to compression coding by a coding-decoding circuit 3 and temporarily stored in an image memory 2. The stored image information is modulated by a modem 4 and then sent out to a line via network control unit (NCU) 5. The modem 4 and NCU 5 are controlled by a communications control section 6.

Signals that are received from a line are demodulated by the modem 4 and stored in the image memory 2. The stored image information is expanded by the coding-decoding circuit 3 and then suitably read out and recorded by a print unit 7. The system control section 8 is constituted by a microcomputer and it follows preset programs to control the various above-noted constituent parts of the system. These programs are stored in a ROM 9 and control data for communications is stored in a RAM 10. An operating section 11 is provided for input of the control data for executing set operations and for input of called station dialed digits.

Figure 1:
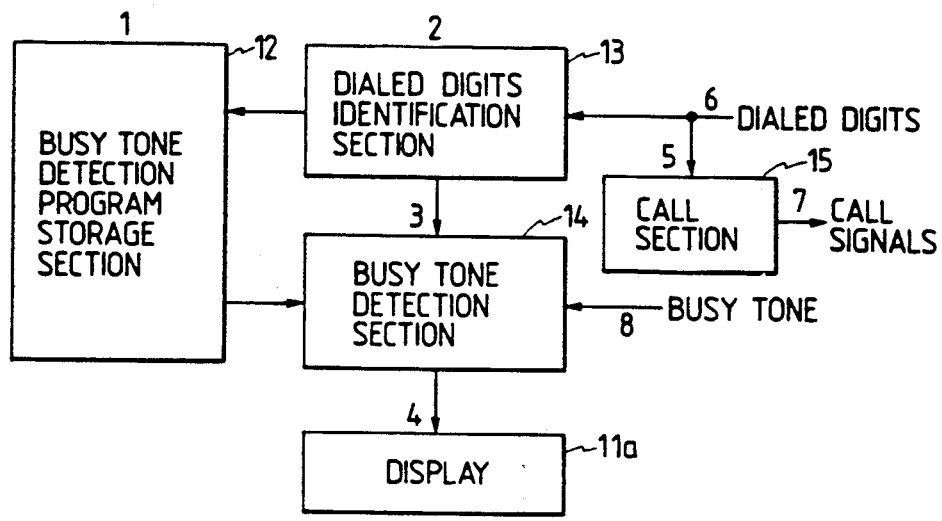
FIG. 1 is a functional block diagram showing one embodiment of a facsimile machine line control system according to the present invention.

Next, the operation of this embodiment will be described. FIG. 1 is a block diagram showing the functions of the main sections of a facsimile machine which can detect busy tones even in communications with overseas parties. FIG. 2 is a flowchart of end-of-message processing which shows the operation of this embodiment.

Referring to FIG. 1, a busy tone detection program storage section 12 is provided in the RAM 10, which also stores busy tone detection programs corresponding to the specifications of busy tones emitted by the exchanges of respective individual countries. Since there are limitations to memory capacity and since in many cases it would be largely pointless for practical purposes if detection programs corresponding to the exchange specifications of all the countries of the world were stored in the busy tone detection program storage section 12, it is sufficient if one refers to the data of past communications records, etc., and loads in programs corresponding to the exchange specifications of the main countries with which there are frequent communications. Some countries have communication networks using a number of different exchange specifications, and in such cases it is necessary to have a busy tone detection program for each area within a given country. Taking the above into consideration, it may be satisfactory for practical purposes if around ten different programs are stored.

A dialed digit identification section 13 identifies a country and an area by referring to the dialed digits inputted from the operating section 11, and in response to its findings, a program stored in the busy tone detection program storage section 12 is selected as the detection program for use in a busy tone detection section 14.

The format of dialed digits for conducting direct overseas connection facsimile communications through an international direct telephone connection service which is, for example, taken by Kokusai Denshin Denwa Co., Ltd.(KDD) is as follows. The initial digits "001" select the international direct connection service and are provided as header digits. These digits are followed by digits that indicate the country and the area, and the dialed digits of the called station.

The dialed digits identification section 13 refers to this format to identify the country and area in question from the dialed digits and selects the busy tone detection program corresponding thereto. The dialed digits are also supplied to a calling section 15, which refers to these dialed digits and transmits a call signal to the called station. If the called station responds to this call signal, image information is transmitted.

If, however, the called station is engaged and it is not possible to establish connection, a busy tone is emitted by an exchange. When the busy tone detection section 14 detects this busy tone following the above-noted selected busy tone detection program, display signals indicating that a busy tone has been detected is given on a display 11a that is provided in the operating section 11.

The display on the display 11a, as described above, in response to busy tone detection may also be accompanied by simultaneous cutting of the line or, in sequential transfer or trunk broadcasting, by processing such as calling of other set destination stations and polling, etc. In other words, the same processing steps performed following detection of busy tones in domestic communications can be performed.

The operation of this embodiment based on the above-described functions will be described with reference to the flowchart of FIG. 2, wherein dialed digits are read in step S1. In step S2, the communication is identified as an international communication or as a domestic communication by noting whether the digits at the head of the dialed digits are, e.g., "001," indicating an international communication or not.

If the result of step S2 is an indication that the communication is a domestic communication, the process goes to step S3 and busy tone detection processing is effected by a domestic (e.g., NTT specification) busy tone detection program that has been loaded in busy tone detection section 14.

If, however, the result of step S2 is a determination that the communication in question is an international communication, the process goes to step S4 and the country dialed is identified by checking the country code that follows the above-noted "001".

Step S5 determines whether or not it is necessary to identify an area by an area code following the country code. In order to determine whether or not identification of an area is necessary, a program which can judge this on the basis of the names of identified countries is installed beforehand.

If there is no need for identification of an area code, step S6 selects the busy tone detection program corresponding to the country code from the selected busy tone detection program storage section 12.

If identification of an area code is necessary, the area is identified in step S7 by checking the area code, and in step S8 the busy tone detection program corresponding to the country code and the area code is selected from the selected busy tone detection program storage section 12.

In step S9, busy tone detection processing is executed by following the busy tone detection program that has been selected in accordance with the country code or area code. If a busy tone is detected, processing such as a busy tone detection display and cutting of the line, etc., that is preset to follow busy tone detection is performed (step S10).

As described above, this embodiment makes it possible to detect even busy tones whose specifications are different in different areas of a country, since it detects busy tones by using busy tone detection programs that correspond to respective countries or areas where stations that are destinations for communications are located.

There are cases in which transmission of busy tones between different countries or between different areas is based on a common specification or on similar specifications, and it is therefore of course possible to reduce the number of programs that must be stored in the busy tone detection program storage section 12. A survey of the specifications of different countries and different areas could be made, and a single, common specification of a busy tone may be selected.

As is clear from the above description, the invention makes it possible for accurate recognition of busy tones that are based on different specifications in different countries or areas to be detected during direct-connection facsimile communications with overseas exchanges by automatic transmission and for subsequent processing, such as line cutting, to be executed rapidly. The invention therefore eliminates wasteful operations caused by the failure to detect busy signals, and increases the convenience of international communications.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A line control system for use in a facsimile machine that communicates with various foreign telephone exchanges that emit busy signals with different specifications when the telephone line of a party called by the facsimile machine is busy comprising:
   busy tone specification storing means for storing specifications identifying the various busy signals emitted by the foreign exchanges when a called telephone is in use;
   dialed digits identification means for identifying that a number called by the facsimile machine is in a foreign country;
   means for accessing from said storing means the specifications of a busy signal for said foreign country of said called number; and
   busy tone detection means for comparing a return signal received by the facsimile machine in response to the calling of said called number to said accessed specifications to determine if said return signal corresponds too said busy signal for said foreign country of said called number.

2. A line control system according to claim 1, wherein a called directed to a called party in a foreign country includes the telephone number of the called part and a header number identifying the call as being directed to a foreign country and wherein said dialed digit identification means identifies that said call is directed to a foreign party based on the presence of said header number.

3. The line control system of claim 2, wherein said header number includes information about the country and the area of the country associated with said dialed telephone number, and wherein said accessing means accesses said busy tone specification based on the information in said header number.

4. The line control system of claim 1, further comprising means, coupled to said comparing means, for displaying a message thereon representing that said dialed telephone number is busy, in response to said comprising means determining that said busy signal is a valid busy signal.

5. The line control system of claim 1, wherein said storing means includes a random access memory.

* * * * *

UNITED STATES PATENT AND TRADEMARK OFFICE
CERTIFICATE OF CORRECTION

PATENT NO. : 5,101,428
DATED : March 31, 1992
INVENTOR(S) : Toshiaki Koue

It is certified that error appears in the above-identified patent and that said Letters Patent is hereby corrected as shown below:

Claim 1, column 6, line 24, change "too" to --to--.

Claim 2, column 6, line 27, change "called" (first occurence) to --call--.

Claim 2, column 6, line 29, change "part" to --party--.

Signed and Sealed this

Twenty-sixth Day of October, 1993

Attest:

BRUCE LEHMAN

Attesting Officer

Commissioner of Patents and Trademarks